(12) United States Patent
Plantan et al.

(10) Patent No.: US 9,506,512 B2
(45) Date of Patent: Nov. 29, 2016

(54) BRAKE CARRIER MOUNTING ARRANGEMENT

(71) Applicant: Bendix Spicer Foundation Brake LLC, Elyria, OH (US)

(72) Inventors: Ronald S. Plantan, Mooresville, NC (US); Dennis A. Wolf, Westlake, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 54 days.

(21) Appl. No.: 14/045,395

(22) Filed: Oct. 3, 2013

(65) Prior Publication Data

US 2015/0096849 A1    Apr. 9, 2015

(51) Int. Cl.
*F16D 65/02*    (2006.01)
*F16D 65/00*    (2006.01)

(52) U.S. Cl.
CPC ........... *F16D 65/02* (2013.01); *F16D 65/0056* (2013.01)

(58) Field of Classification Search
CPC .............. F16D 65/02; F16D 65/0056; F16D 65/0068; F16D 65/0075; F16D 2055/0008
USPC ............................................ 188/73.39, 73.46
See application file for complete search history.

(56) References Cited

U.S. PATENT DOCUMENTS

| | | | | |
|---|---|---|---|---|
| 3,719,257 A | * | 3/1973 | Maurice | ...................... 188/73.39 |
| 3,999,635 A | | 12/1976 | Hotchkiss | |
| 4,461,372 A | * | 7/1984 | Bekkala et al. | ........... 188/73.34 |
| 7,673,723 B2 | * | 3/2010 | Paul et al. | .................. 188/73.39 |
| 7,896,141 B2 | * | 3/2011 | Baumgartner et al. | .... 188/73.46 |
| 2005/0150729 A1 | | 7/2005 | Baumgartner et al. | |
| 2007/0137953 A1 | | 6/2007 | Paul et al. | |
| 2008/0087507 A1 | | 4/2008 | DeMorais et al. | |

FOREIGN PATENT DOCUMENTS

DE        40 32 886 A1      4/1992
EP         2236369 B1   *  11/2011

OTHER PUBLICATIONS

U.S. Appl. No. 11/110,774, filed Apr. 21, 2005.
International Search Report (PCT/ISA/210) dated Dec. 30, 2014 (Two (2) pages).
Written Opinion (PCT/ISA/237) dated Dec. 30, 2014 (Four (4) pages).

* cited by examiner

*Primary Examiner* — Thomas J Williams
(74) *Attorney, Agent, or Firm* — Crowell & Moring LLP

(57) ABSTRACT

A mounting arrangement for a disc brake is provided, in which a torque plate affixed to a vehicle axle and a brake caliper mounting frame affixed to the torque plate have corresponding opposing projections and recesses provided to laterally and circumferentially limit relative motion between the torque plate and the mounting frame. A wedge element with at least one angled face is located between correspondingly-angled faces of the mounting frame and/or the torque plate to generate lateral and/or circumferential loading in response to tightening of vertically-oriented fasteners. The use of the angled components substantially reduces the amount of loading required to be applied by the vertical fasteners to resist relative motion between the torque plate and the mounting frame.

9 Claims, 4 Drawing Sheets

BRAKE CARRIER MOUNTING ARRANGEMENT

BACKGROUND AND SUMMARY OF THE INVENTION

The present invention relates to disk brakes, and in particular to a mounting system for a brake caliper mounting frame assembly of a disk brake.

In commercial vehicle application, disc brakes, in particular pneumatically-operated disc brakes, are replacing drum-style brakes due to advantages in areas such as cooling, fade resistance and serviceability. German patent publication DE 40 32 886 A1, and in particular FIG. 1 of this document, discloses an example of such an air disc brake.

The adaptation of disc brake technology to commercial vehicle applications has not been without engineering challenges. Commercial vehicle wheel rims are sized, both in diameter and axial offset, to provide adequate clearance for the drum-type brakes historically employed on such vehicles. The resulting space envelope between the wheel and its axle is limited, leaving little space available for a pneumatic disc brake. This lack of available space in turn results in the need to design brake components to conform to the constrained space envelope and avoid interference with nearby vehicle components, such as an immediately adjacent axle flange or air valve stems of the wheel.

Pneumatic disk brake designs typically use a brake caliper which straddles a friction portion of brake disc located on an axle hub. The brake caliper in such brakes is mounted to an intermediate mounting frame (also known as a "carrier"), which in turn is affixed to a mounting plate (also known as a "torque plate") which transfers the braking torque generated by the caliper to the vehicle axle. An example of such prior art brake arrangements is shown in FIG. 1, which is a detailed partial view showing the arrangement of a caliper 1 located at either caliper end 2 by pins (second caliper end not shown) on mounting frame 3. The caliper mounting frame 3 is held to torque plate 4 by bolts (not illustrated) which pass through torque plate holes 5 and thread into corresponding threaded holes in the mounting frame 3. The torque plate may be affixed to the axle in various ways, such as welding to the axle housing, however, the most common approach is bolting of the torque plate through holes 6 to an axle flange which is perpendicular to the axle longitudinal axis (flange not illustrated for clarity).

There are several disadvantages to the previous caliper mounting frame arrangements, many of which stem from the configuration of the frame mounting bolts, which are generally aligned parallel to longitudinal axis of the axle. The previous designs require installation tool clearance behind the torque plate to permit insertion and/or removal of the frame mounting bolts and insertion of an installation tool to tighten and/or loosen the bolts. Achieving sufficient clearance for frame mounting bolt installation and/or removal is problematic due to the close proximity of other vehicle components, such as the axle housing, axle flanges, vehicle suspension (e.g., leaf springs and brackets, shock absorbers and mounts), and steering components (e.g., tie rod ends, and arms, steering arm). These space constraining components frequently require the disk brake caliper and its mounting frame to be "clocked" (i.e., rotated about the longitudinal axis of the axle) in order to avoid interference with other vehicle components during brake operation or service. Even with clocking of the brake to a sub-optimum position about the axle, access to at least one of the mounting frame bolts usually remains limited, preventing the use of time- and labor-saving power tools (e.g., a pneumatic wrench) during bolt installation and removal.

Further disadvantages of the previous mounting bolt arrangements result from the need to include additional material to certain portions of the caliper mounting frame and torque plate, which can lead to compromising the strength of these components in order to fit the disk brake into the available space envelope. For example, because the frame mounting bolts are parallel to the longitudinal axis of the axle, and must be threaded into the mounting frame (in order to minimize bolt projection from the torque plate toward the longitudinal center of the axle), a significant amount of extra frame material must be provided around the mounting bolt holes to support the bolt threads. Given its location at the extreme ends of the caliper mounting frame, this extra frame material does not improve the structural strength of the mounting frame, and thus only adds to the weight of the frame. Further, in order to provide sufficient material about the mounting bolt holes to ensure sufficient bolt thread engagement in the mounting frame, the mounting frame ends typically are so thick that the portion of the torque plate containing the mounting frame mounting bolt holes must be offset away from the brake disk so that there is enough room between the disk and the torque plate to accommodate the enlarged mounting frame ends. As a result of the offset, thin-walled sections are created in the torque plate in the transition regions between the offset mounting bolt holes and the center portion of the plate that is bolted to the axle flange. These thin-walled sections are highly stressed, and past practice has been to add material in adjoining areas of the torque plate to reduce the stress concentration in the thin-walled sections. This additional material, resulting from the longitudinal mounting frame mounting bolt orientation, is an additional inefficient use of structural material, further increasing brake weight and cost.

Many of the problems of the prior art caliper mounting designs are addressed by the new disk brake caliper mounting arrangement set forth in of U.S. patent application Ser. No. 11/110,774, the disclosure of which is incorporated herein by reference in its entirety. This Application is directed to an improved disk brake mounting arrangement as shown, for example, in FIGS. 2 and 4 of the Ser. No. 11/110,774 application, which is lighter, simpler, less costly and/or easier to assemble and service, in which a brake caliper mounting frame 20 (receiving a caliper 12) and a corresponding torque plate 30 are arranged such that the mounting bolts 32 are oriented in one or more planes which are generally perpendicular to the longitudinal axis 33 of the vehicle axle. The mounting bolts 32 may be oriented radially away from the longitudinal axis of the axle, or, as shown in FIG. 2, may be oriented in a generally tangential direction, and may be inserted radially inward through the top of the mounting frame into threads in the torque plate, or, as shown in FIG. 2, radially outward through holes in the torque plate flange into threads in the mounting frame. Among the advantages of the new approach of the Ser. No. 11/110,774 application, is the elimination of: the need for excess material to be provided at the ends of the intermediate mounting frame; the need to provide an offset in the mounting hole portion of the torque plate; the need to "clock" the brake assembly away from an optimal angular position about the longitudinal axis of the axle; and access issues which limit the serviceability of the brake.

While the vertical caliper mounting arrangements of the Ser. No. 11/110,774 approach offers numerous advantages over prior art longitudinally-oriented mounting bolt designs, new brake designs utilizing the concepts of the Ser. No.

11/110,774 application require careful design of the caliper mounting bracket, torque plate, and the joints between these components to ensure design limits for allowable stresses, fatigue life, etc., will be met. Prior art mounting bracket-to-axle mounts (e.g., torque plates) typically had pairs of parallel machined mating surfaces perpendicular to the longitudinal axis of the axle, with one or more fasteners clamping the components together. Due to their orientation, a primary loading direction when the brake is applied is in shear along the components' mating surfaces. These joints rely on friction between the faces (a function of the clamping load of the fasteners) to maintain the orientation of the parts relative to one another, and thereby avoid flexing or other displacements which can lead to distortion of the caliper, binding of the caliper on its sliding pins and highly-localized stress in brake components.

The arrangements taught by the Ser. No. 11/110,774 application place the mounting frame/torque plate mating surfaces perpendicular to the prior art location of these surfaces. These surfaces and their mounting bolts therefore are loaded in an entirely different manner when the brake is applied than with a prior art mounting arrangement. Nonetheless, it remains important to maintain a positionally-fixed relationship between the caliper bracket and its mount to prevent flexing or shifting of the brake components relative to one another, which can lead to high stresses in localized areas of the brake, including in the portion of the mounting bracket straddling the brake disk rotor.

One approach to preventing relative motion (e.g., slippage) between the brake mounting components is to apply greater clamping loads between the mounting frame and the torque plate to increase the friction force between these two components. This can be accomplished by increasing the size of the mounting bolts, which in turn requires increasing the size of the mounting frame and torque plate to accommodate the larger bolts. However, while this approach may be viable in applications such as European commercial vehicles which have considerably larger wheel rims, it is not practical in more demanding vehicle applications, such as U.S. commercial vehicles which typically operate with smaller wheels with extremely limited space between the brake and the inner wheel rim surface.

The present invention addresses the problems of brake component relative motion arising from the re-location of mounting and fastening surfaces in the vertical mounting system by use of specially arranged mounting features on the torque plate and/or the caliper mounting frame, coupled with use of an intermediate component which reduces the required fastener loadings. These features between the caliper mounting frame and the corresponding torque plate mating surfaces to minimize bolted joint tolerances and to resist rotating and/or sliding movements, thereby minimizing slippage-induced distortion of the caliper and maintaining a precise alignment of the caliper mounting frame relative to the brake disk rotor.

In one embodiment of the present invention a locating feature is provided on the torque plate and/or the caliper mounting frame, with the locating feature being arranged to minimize axial movement of the mounting frame relative to the torque plate (and thus also minimize rotation of the mounting frame relative to the torque plate about an axis perpendicular to the axle's longitudinal axis). The locating feature may be a raised rectangular protrusion on an upper surface of the torque plate which engages a corresponding recess in the caliper mounting frame. At least one of the torque plate protrusion and the mounting frame recess has an angled face in a direction parallel to the brake disc rotation plane.

In this embodiment the torque plate protrusion and the mounting frame recess are sized to permit a wedge lock element which engages the angled face to be located therebetween. The wedge element effectively multiplies the force generated by the vertically-oriented fasteners passing through the mounting frame into the torque plate, thereby permitting the use of lower fastener torque values and/or fewer fasteners, as the fasteners no longer need to apply an extraordinarily high clamping load. In this arrangement the wedge element provides the required strength in the lateral direction at the torque plate-mounting frame interface for resisting braking torques and resulting relative motion between the brake components, with the fasteners needing to only provide sufficient loading to prevent vertical separation of the mounting frame from the torque plate.

It will be readily understood by one of ordinary skill that the present improved mounting arrangements are not limited to a specific wedge element arrangement, but could be any arrangement feature which translates vertical clamping loading from a fastener to a lateral loading which resists transverse relative motion, either in a direction of the longitudinal axis of the axle or in the circumferential direction of the brake disc. For example, the wedge element may have portions on more than one face about the periphery of the protrucing mounting feature, or may have both inner and outer faces either angled at parallel planes or having different angles (including one of the inner and outer faces being vertical, i.e., parallel to the axis of the fastener securing the carrier mount frame to the torque plate.

Other objects, advantages and novel features of the present invention will become apparent from the following detailed description of the invention when considered in conjunction with the accompanying drawings.

DETAILED DESCRIPTION OF THE DRAWINGS

Figure 1:
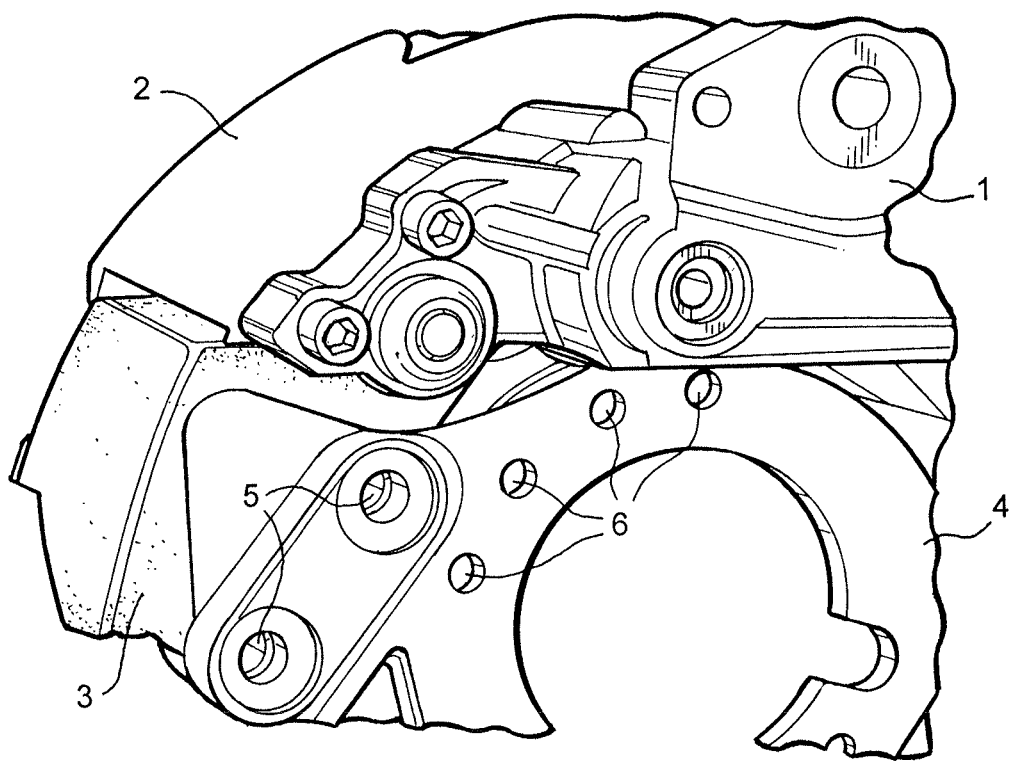
FIG. 1 is an oblique partial view of a prior art pneumatic disk brake caliper and mounting assembly.
Figure 2:
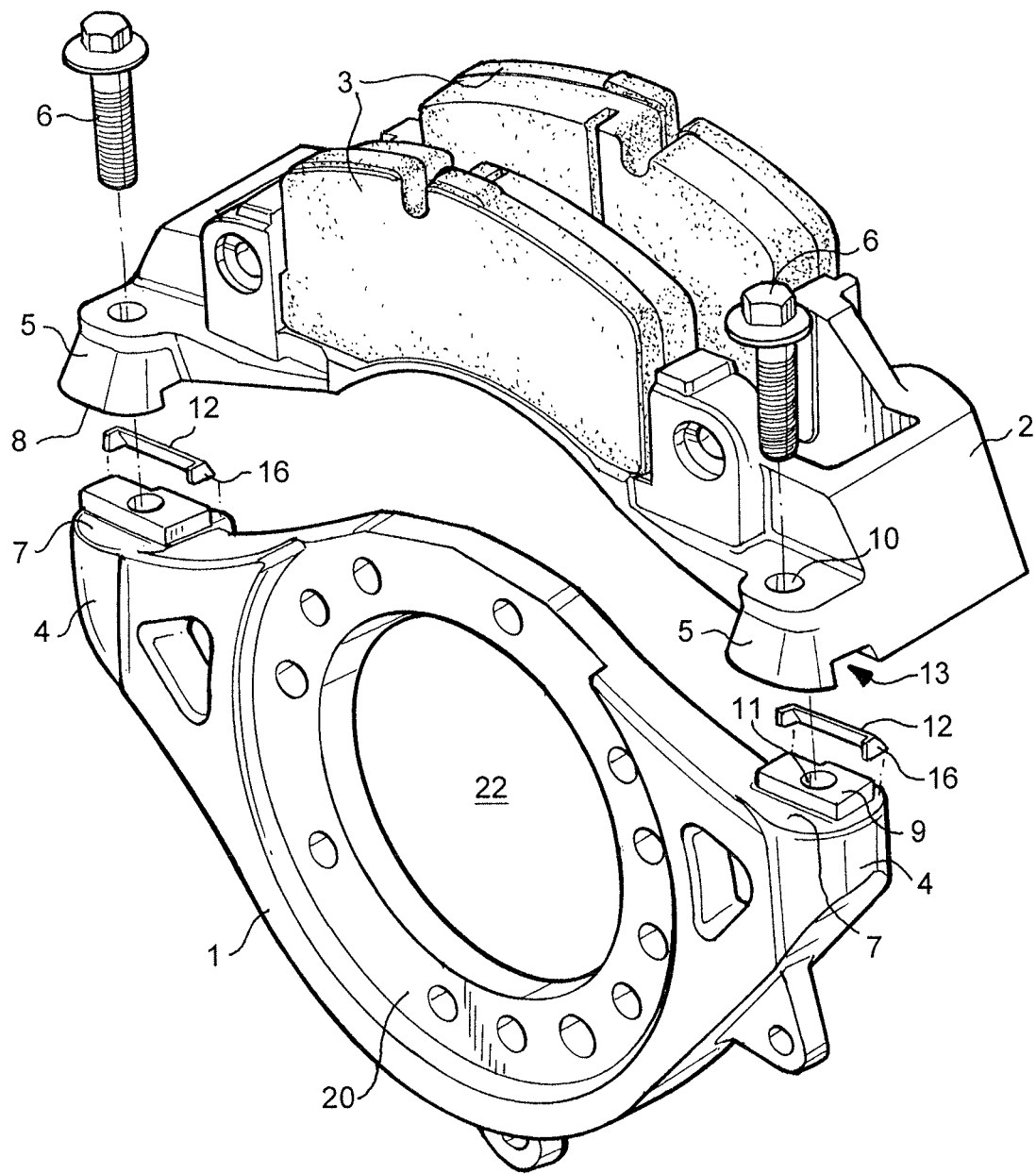
FIG. 2 is an exploded oblique view of an embodiment of a pneumatic disk brake mounting system with vertically-oriented mounting bolts and corresponding mating surface arrangements.
Figure 3:
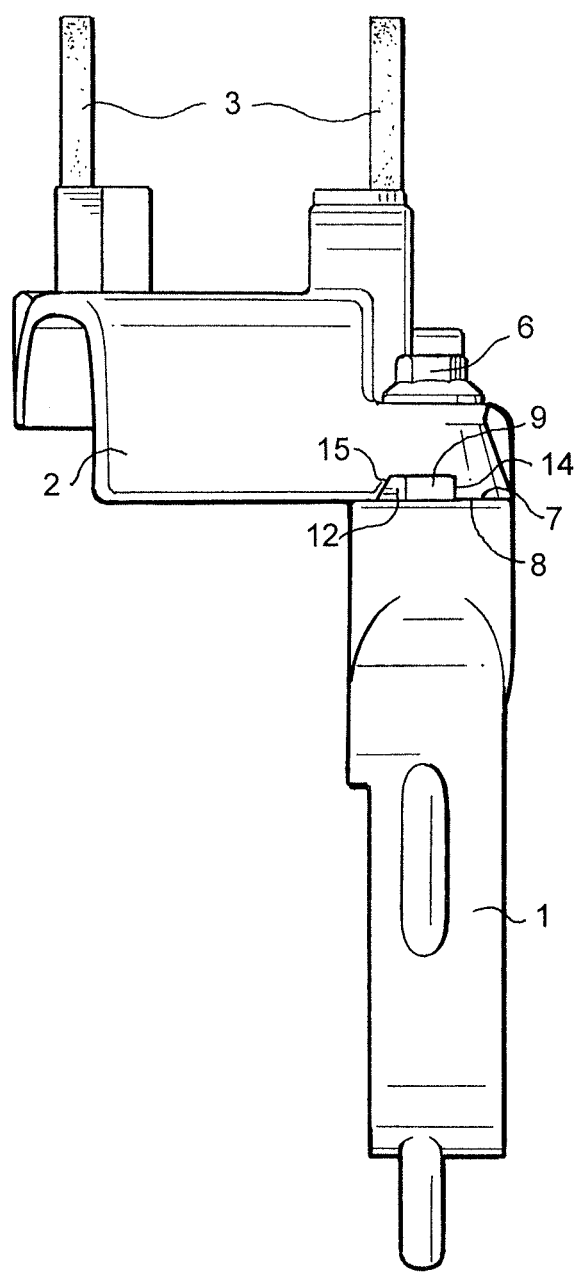
FIG. 3 is an elevation view of the mounting frame and torque plate arrangements of an embodiment of the present invention similar to the FIG. 2 embodiment.

FIGS. 2 and 3 are embodiments of the brake carrier mounting arrangements of the present invention. In both embodiments, torque plate 1 is configured to be mounted on a vehicle axle (not illustrated) passing through axles hole 22 and fixed to the axle through holes in the mounting flange 20 with fasteners (not illustrated). The torque plate 1 is configured to receive a brake caliper carrier mounting frame 2 which carries brake pads 3 and supports a brake caliper (not illustrated) arranged to press the brake pads 3 against friction surfaces of a brake disc (not illustrated) rotating between the brake pads 3.

The torque plate 1 includes lateral outboard mounting lugs 4 arranged to thereon. The mounting lugs 4 have upper surfaces 7 facing the mounting frame 2, and a raised projection 9 on each of the upper surfaces 7. In the FIG. 2-3 embodiments, the projections 9 are generally rectangular-shaped blocks. In the FIG. 2 embodiment, the projections 9 have one face generally parallel to the brake disc and an opposite inclined. In the FIG. 3 embodiment, the projections 9 are generally rectangular-shaped blocks with parallel faces, as shown in the FIG. 3 elevation view. The projections 9 have threaded holes 11 therein to receive fasteners 6 when the mounting frame 2 is located on the torque plate 1.

The mounting frame 2 includes mounting lugs 5 corresponding to the mounting lugs 4 of the torque plate 1. The mounting frame lugs 5 each have lower surfaces 8 which are configured to conform to the torque plate upper surfaces 7 when the mounting frame is located on the torque plate 1. The mounting lugs 5 also include a hole 10 through which fasteners 6 pass, and a recess 13 generally corresponding to the raised projections 9 of the torque plate 1. A bolt would hold the torque plate and carrier together. As best seen in FIG. 3, in this embodiment one side 14 of each recess 13 is perpendicular to the lower surface 8 of the mounting lug 5, and the opposing angled side 15 is formed at a non-perpendicular angle to the lower surface 8.

Located between the angled side 15 of the mounting frame recess 13 and its opposing perpendicular face of the projection 9 is a wedge element 12. The wedge element 12 has an angled face opposite the angled side 15 of the mounting frame recess 13. In the FIG. 2 embodiment, the wedge element 12 surface facing the projection 9 is also angled at approximately the same angle as the face facing angled side 15. In the FIG. 3 embodiment, the wedge element 12 surface facing the projection 9 is not significantly angled, i.e., is parallel to the correspondence generally right-angle face of projection 9.

Figure 4A:
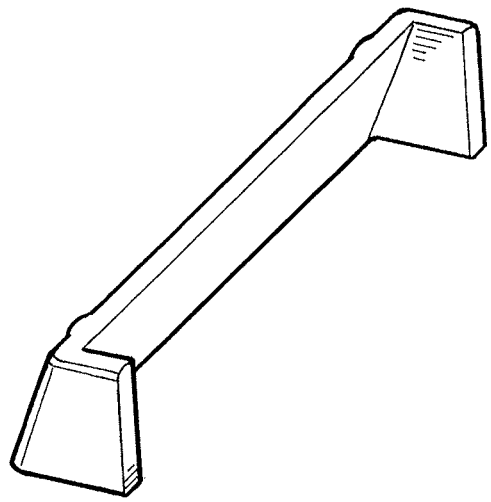
FIGS. 4a and 4b are oblique views of embodiments of in accordance with the present invention.
Figure 4B:
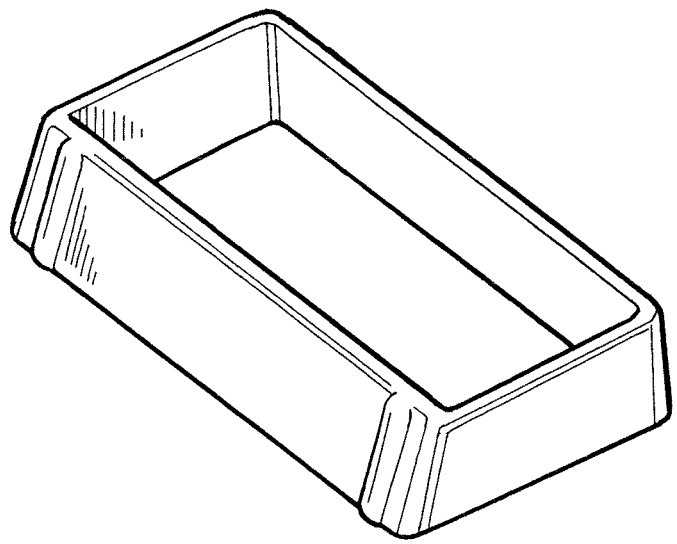

The wedge element 12 has a height between the upper surface 7 and the lower surface 8 which is at least as short as height of the recess 13 when the fasteners 6 are fully tightened. The wedge element 12 may also have lateral extensions 16 which wrap around the ends of the projections 9 to assist in locating the wedge elements during assembly and to resist ejection of the wedge elements 12 during brake operation, as shown for example in FIG. 4a. The extensions may also wrap completely around to enclose the projections 9, as shown for example in FIG. 4b. Alternatively or in addition, a stud in the torque plate could be used as an alignment device, in addition to or in lieu of a fastener, and the wedge element 12 could be located and/or aligned by the stud. Further, while FIGS. 2-3 illustrate projections 9 on the torque plate and recesses 13 in the caliper mounting frame, these arrangements may be reversed, with the mounting frame having a projection and the torque plate having a recess sized to accommodate the projection and the wedge element.

When the fasteners 6 are fully tightened, the vertically-oriented compressive force generated by the fastener 6 which passes through angled face 15 generates both vertically- and laterally-oriented forces on the wedge element 12. The lateral portion of these forces provides a substantial loading between the wedge element 12, the torque plate protrusion 9 and the mounting frame recess 13 to remove any slack between these components and strongly bias the joint against relative motion in the lateral direction, and thus strongly resist relative motion of the brake components during bake application. Further, by use of the wedge element 12 to effectively "separate" the vertical and lateral loading produced by the tightening of the fasteners 6, these fasteners no longer need to be tightened to the high stress levels previously required when all of the lateral motion resistance was provided only by friction between the mounting surfaces of the torque plate and the mounting frame (i.e., when generating a sufficiently high friction force to resist lateral motion required application of a large normal force by the mounting frame-to-torque plate fasteners).

Because the conforming configuration of the wedge element, mounting frame and torque plate of the present invention does not require high fastener loading to obtain sufficient resistance to lateral motion of the mounting frame, the reduction in the required axial force to be generated by the fasteners may permit the use of smaller fasteners, elimination of a need for multiple fasteners (e.g., three at both sides of the torque plate) and/or use of lower cost (i.e., lower strength grade) fasteners. In addition, because the mounting lugs are no longer required to be able to withstand very high loadings from highly-stressed fasteners, the mounting arrangements of the present invention permit significant reduction in the size (and hence weight and cost) of the mounting frame-to-torque plate mounting lugs.

The foregoing disclosure has been set forth merely to illustrate the invention and is not intended to be limiting. For example, one of ordinary skill will recognize that a wedge element lay also be fitted between the mounting lugs faces perpendicular to the circumferential direction to increase resistance to relative motion between the mounting frame and the torque plate in the circumferential direction. Similarly, one of ordinary skill would recognize that an "L"-shaped wedge element would provide simultaneous increases in both lateral and circumferential resistance to relative motion without the need for high fastener loadings, and that the faces of the wedge elements may be set at angles which are not perpendicular to the upper and lower mounting surfaces of the toque plate and the mounting frame, respectively. Because other such modifications of the disclosed embodiments incorporating the spirit and substance of the invention may occur to persons skilled in the art, the invention should be construed to include everything within the scope of the appended claims and equivalents thereof.

What is claimed is:

1. A disc brake mounting arrangement, comprising:
    a torque plate configured to be mounted on a vehicle axle;
    a caliper mounting frame configured to be mounted on the torque plate;
    at least one alignment device; and
    at least one wedge element;
    wherein
        the torque plate and the mounting frame are configured to receive the at least one alignment device to secure the mounting frame to the torque plate,
        at least one of the torque plate and the mounting frame includes a planar mounting surface with a raised projection projecting above a plane at which the planar mounting surface of the at least one of the torque plate and the mounting plate abuts a corresponding planar mounting surface of the other of the at least one of the torque plate and the mounting frame, and the corresponding planar mounting surface of the other of the at least one of the torque plate and the mounting frame includes a recess corresponding to the raised projection, the recess being recessed from the plane when the mounting frame is in an installed position on the torque plate,
        at least one of the raised projection and the recess has an angled lateral face arranged at an angle relative to a longitudinal axis of the at least one alignment device when the at least one alignment device is in an installed position, the at least one wedge element has at least one angled wedge face corresponding to the angled lateral face of the at least one of the raised projection and the recess, and the at least one wedge element is configured to be located between the raised projection and the recess with the at least one angled wedge face facing the angled lateral face when the mounting frame is located on the torque plate and the at least one alignment device is in an installed position.

2. The disc brake mounting arrangement of claim 1, wherein the torque plate includes mounting frame-receiving mounting surfaces located on opposite sides of an axle mounting aperture of the torque plate.

3. The disc brake mounting arrangement of claim 2, wherein the mounting frame includes mounting surfaces corresponding to the torque plate mounting frame-receiving mounting surfaces.

4. The disc brake mounting arrangement of claim 3, wherein each the torque plate mounting frame-receiving mounting surfaces includes the raised projection and each of the mounting frame mounting surfaces includes the recess corresponding to the raised projection.

5. The disc brake mounting arrangement of claim 4, wherein each mounting frame mounting surface recess has a lateral face at an angle corresponding to the angle of the angled wedge face of the wedge element.

6. The disc brake mounting arrangement of claim 1, wherein
the at least one alignment device is a fastener.

7. The disc brake mounting arrangement of claim 1, wherein
the at least one alignment device is a stud.

8. A disc brake mounting arrangement, comprising:
a torque plate configured to be mounted on a vehicle axle and to receive a caliper mounting frame; and
a wedge element,
wherein
the torque plate is configured to receive at least one alignment device to secure the mounting frame to the torque plate,
the torque plate includes a planar mounting surface with a feature in the form of one of a raised projection projecting above a plane at which the mounting surface abuts a corresponding planar mounting surface of the mounting frame when the mounting frame is in an installed position on the torque plate or a recess recessed from the planar mounting surface configured to receive a corresponding mounting frame feature in the form of a projection when the mounting frame is in the installed position on the torque plate, the torque plate feature being configured to cooperate with the corresponding mounting frame feature with the wedge element therebetween, and
the torque plate feature includes a lateral face which, when the wedge element is in an installed position between the torque plate and the mounting frame, cooperates with the wedge element to include a face between the torque plate and the mounting frame that is angled relative to a longitudinal axis of the at least one alignment device when the at least one alignment is in an installed position.

9. The disc brake mounting arrangement of claim 8, wherein the torque plate includes mounting frame-receiving mounting surfaces located on opposite sides of an axle mounting aperture of the torque plate.

* * * * *